(12) United States Patent
Pollert et al.

(10) Patent No.: US 12,542,757 B2
(45) Date of Patent: Feb. 3, 2026

(54) DATA SOURCE ANALYSIS USING HARDWARE BASED PACKAGE EVALUATION

(71) Applicant: ZOE LIFE TECHNOLOGIES AG, Herisau (CH)

(72) Inventors: Heiner Pollert, Munich (DE); Hardy Schloer, Munich (DE)

(73) Assignee: ZOE LIFE TECHNOLOGIES AG, Herisau (CH)

( * ) Notice: Subject to any disclaimer, the term of this patent is extended or adjusted under 35 U.S.C. 154(b) by 31 days.

(21) Appl. No.: 18/790,585

(22) Filed: Jul. 31, 2024

(65) Prior Publication Data
US 2024/0388564 A1    Nov. 21, 2024

Related U.S. Application Data

(63) Continuation of application No. PCT/EP2021/083257, filed on Nov. 27, 2021.

(51) Int. Cl.
*H04L 61/5007* (2022.01)
*H04L 41/147* (2022.01)
*H04L 101/659* (2022.01)

(52) U.S. Cl.
CPC ........ *H04L 61/5007* (2022.05); *H04L 41/147* (2013.01); *H04L 2101/659* (2022.05)

(58) Field of Classification Search
CPC .............. H04L 61/5007; H04L 41/147; H04L 2101/659; G06F 40/20; G06F 40/205; G06F 40/295; G06N 20/00; G06N 5/022
See application file for complete search history.

(56) References Cited

U.S. PATENT DOCUMENTS 8,364,519 B1 * 1/2013 Basu ................ G06Q 10/06393
                                                        705/7.38
10,805,226 B2 * 10/2020 Imes ...................... H04L 47/70
(Continued)

FOREIGN PATENT DOCUMENTS

EP      1714445 B1    3/2012
EP      2751955 B1   11/2019
(Continued)

OTHER PUBLICATIONS

International Search Report issued by the European Patent Office for International Patent Application No. PCT/EP2021/083257, dated Aug. 29, 2022.
(Continued)

*Primary Examiner* — Benjamin M Thieu
(74) *Attorney, Agent, or Firm* — Myers Wolin, LLC

(57) ABSTRACT

A method is provided for analysis of large data sources by operating a network that is formed according to pre identified structures. Once the structure is identified the resulting network is operated and by extrapolating network traffic future data source developments can be predicted. The suggested method is able to automatically perform technical processes such that firstly no human ado is required and secondly the resulting data is not prone to errors. The method suggests iterations on evolving data sets and hence a bias is excluded or at least minimized in each iteration. Also provided is a respectively arranged system along with a computer program product and a computer-readable medium.

12 Claims, 10 Drawing Sheets

(56) References Cited

U.S. PATENT DOCUMENTS

| | | | |
|---|---|---|---|
| 11,087,261 B1* | 8/2021 | Basu | G06Q 10/0639 |
| 2017/0359417 A1* | 12/2017 | Chen | H04W 60/04 |
| 2020/0090070 A1* | 3/2020 | Bhattacharyya | G06N 7/023 |
| 2021/0089860 A1* | 3/2021 | Heere | G06N 20/00 |

FOREIGN PATENT DOCUMENTS

| | | |
|---|---|---|
| EP | 3872676 A1 | 9/2021 |
| WO | 2019086638 A1 | 5/2019 |
| WO | 2020079014 A1 | 4/2020 |

OTHER PUBLICATIONS

Hardy F. Schloer et al., "Introduction to C+8 Technology", Prisma Analytics, Aug. 2019, pp. 1-76, vol. 2.0, Prisma Analytics GmbH.
Edain Technologies AG, "Edain Whitepaper", 2021, Version 1.0/2021, pp. 1-39.

* cited by examiner

BUILDING THE MATRIX

MEMBERS OF A GROUP

| | A | B | C | D | E | F | G |
|---|---|---|---|---|---|---|---|
| 1 | 30773 | 80571 | 31178 | 52799 | 41050 | 76298 | 43995 |
| 2 | 36114 | 64549 | 79244 | 82044 | 00202 | 45727 | 35709 |
| 3 | 03002 | 64549 | 54677 | 55745 | 52540 | 62154 | 33314 |
| 4 | 53608 | 64549 | 42927 | 90993 | 46795 | 05947 | 01934 |
| 5 | 94861 | 64549 | 61085 | 81758 | 89640 | 39437 | 90044 |
| 6 | 62532 | 64549 | 39842 | 62273 | 94980 | 23415 | 64668 |
| 7 | 17411 | 64549 | 66545 | 82163 | 61868 | 22752 | 40101 |
| 8 | 77486 | 64549 | 00985 | 31960 | 39033 | 44374 | 28352 |

QUANTITATIVE MEASUREMENTS → (rows)

*FIG. 7*

DATA SOURCE ANALYSIS USING HARDWARE BASED PACKAGE EVALUATION

CROSS REFERENCE TO RELATED APPLICATIONS

This application is a continuation of International Application No. PCT/EP2021/083257, filed on Nov. 27, 2021, the entire contents of which are incorporated by reference herein.

TECHNICAL FIELD

The present invention is directed towards a method for analysis of large data sources by operating a network that is formed according to pre identified structures. Once the structure is identified the resulting network is operated and by extrapolating network traffic future data source developments can be predicted. The suggested method is able to automatically perform technical processes such that firstly no human ado is required and secondly the resulting data is not prone to errors. The method suggests iterations on evolving data sets and hence a bias is excluded or at least minimized in each iteration. The invention is furthermore directed towards a respectively arranged system along with a computer program product and a computer-readable medium.

BACKGROUND

EP 1 714 445 B1 shows communication systems, and more particularly configuring addresses in a packet switched communication system for communication network elements, such as telecommunication equipment.

EP 2 751 955 B1 shows a resource manager, system, and method for communicating resource management information for smart energy and media resources using IPv6.

The Internet Protocol version 6, IPv6 for short, is commonly known in the art and is used for addressing web sites, hosts, servers and in general internet resources. More sophisticated approaches address machines such as robots or technical devices from the domain of the internet of things. In general IPv6 addresses are represented as eight groups, separated by colons, of four hexadecimal digits. IPv6 provides an Internet Layer protocol for packet-switched internetworking and moreover provides end-to-end datagram transmission across multiple IP networks.

WO 2019/086 638 A1 shows a method for building computing machinery out of multiple separate networked components, wherein the method of assigning addresses to individual network nodes is designed to make improbable, to any required degree of certainty, the possibility that one node in the network or sub-network has the same address as another node in the network or subnetwork, and for communicating messages to and from such nodes with assigned addresses to other and possibly different nodes with possibly different addresses in said computer network. The multiple separate network nodes are capable of computing functions on the data sent to them, and of responding with the data resulting from said computations or transmitting such results to other nodes in the network. Collectively a system of such nodes implements a finite general purpose Turing machine.

WO 2020/079 014 A1 shows representations of physical objects in text, stores them in a particular type of database, and allows simplified retrieval and abstraction of said physical objects. The simplified retrieval and abstraction facilitates the drawing of inferences regarding properties and behavior of a particular object from consideration of other properties and behaviors of that object and from references to that object and associations related to that object.

Complex data sets of extensive amount are typically processed using superscalar computers and respective queries are provided to the user by likewise huge amounts of data sets, from which the user has to choose the appropriate information. Typically, the prior art does not provide a solution to the problem that big data has to be understood by the user who typically operates limited hardware resources.

Existing technologies lack an holistic approach to extracting and modelling technical content out of heterogeneous data sets of large scale, also referred to as big data. Moreover, not only current technical trends need to be identified in data sets but future dynamics are of importance to get an understanding of data development.

SUMMARY

It is an object of the present invention to provide a computer implemented method for wholistic analysis of big data and information extraction. The method shall be performed without human ado as large quantities shall be processed. The method shall also remedy a possible bias or at least minimize a bias. It is also an object of the present invention to provide a system arrangement being designed in accordance with the suggested method. Moreover, it is an object of the present invention to provide a respectively arranged computer program product and a computer-readable medium.

Accordingly, a method for hardware based package analysis for interpreting data sources is suggested, comprising the steps of performing data import from a developing distributed heterogeneous data source, thereby extracting object entities from different raw data formats and storing these object entities as textual object entities; extracting respectively at least one object entity property for each of the object entities from the distributed heterogeneous data source; generating relations between the stored textual object entities as a function of the at least one extracted object entity property; assigning a unique IPv6 address to respectively each object entity, respectively each object entity property and respectively each relation; forming an at least partially hardware based computer network, wherein each object entity, each object entity property and each relation is represented as a network component being addressable by the respective IPv6 address; operating the network by sending at least one package over the network between the network components at the occurrence of respectively one of the object entity, object entity property or relation in the heterogeneous data source; calculating statistical measurement parameters for describing a dataflow in the formed computer network and storing resulting measurement parameters as a first measurement parameter set; repeating the above steps time delayed while the distributed heterogeneous data source develops and storing resulting measurement parameters as a second measurement parameter set; and extracting deviations in the second measurement parameter set from the first measurement parameter set and extrapolating the extracted deviations to predict future measurement parameters.

The method is performed iteratively such that the underlying network is refined. In preliminary steps the network is created and once the network is available raw data is analyzed by operating the network and measuring network parameters.

The present disclosure suggests to model data collections of a data source such that each concept receives an IPv6 address and accordingly a computer network is arranged. In preliminary steps the network is set up and further data analysis is performed, where at the occurrence of a pre modeled concept, such as a relation, entity or property, is identified the network is operated accordingly by sending at least one data package.

The present disclosure is directed towards a method for evaluation of data, wherein it was surprisingly found out that raw data can be simulated using hardware devices. The method actively operates and control hardware components to establish a network that provides hardware components that simulate the relationships between real world concepts. Embodiments of the invention are able to use existing network technology to identify relations between extracted information.

Embodiments of the present invention develop technical aspects of the application domains of IPv6 further in the direction of addressing hardware and providing specific hardware configurations. It has been surprisingly found out that IPv6 provides several technical advantages over the prior art when addressing and configuring machines as the concepts can largely contribute to an advanced addressing of machines over the network as the IPv6 addresses can be distributed over existing networks at great speeds and moreover very reliable.

Moreover, IPv6 provides technical advantages over previous versions such as IPv4 for instance when it comes to coding information. Embodiments of the present invention aim at configuration of hardware modules in a unique way such that each component can individually be addressed, not over a broadcast, which is of such efficiency regarding latency that the addressing of components can be performed at real time. Hence, hardware being security relevant is addressed almost immediately surprisingly making real time applications possible such as autonomous driving or precise control of manufacturing robots.

The protocol used for the underlying scenario is more efficient due to some design specifications for instance the size of packages may be reduces by leaving out optional header fields. Embodiments of the present invention enhance the scope of known protocol such that huge amounts of machine readable languages can be processed and communicated over a network.

Embodiments of the present invention make use of the data fields in IPv6 that are unused and can therefore code additional payload information. For instance the IPv6 format holds so called extension headers that may hold optional information. In case this optional information is not used it can be used for the purposes of the present invention and code payload data as currently suggested. The data can be coded in the header fields and/or even in the address fields in case not the full address range is required to address a specific receiver. As previous versions such as IPv4 required less blocks it was found out that not the full excessive range of IPv6 is required but even in the address blocks payload can be coded. Once the receiver recognizes the semantics of the address fields they can code both address and payload data. In this way payload can be transmitted in packages that are to be sent anyway and hence less bandwidth is required. The coding of information in the IPv6 headers provides an alternative solution compared to the coding in the payload sections and provides network specific advantages as the IPv6 packets are handled differently by network components.

IPv6 addresses are identifiers for single or multiple interfaces for end devices. Different treatment results from the three types of addresses. A unicast address is an identifier for a single interface. A data packet sent to the unicast address is delivered to the interface marked with this identifier. Anycast addresses are identifiers for a number of interfaces belonging to different devices. A data packet sent to an anycast address is delivered to an interface marked with this identifier. Multicast addresses identify a number of interfaces that belong to different devices. A data packet sent to a multicast address is sent to all interfaces with this identifier. Thus, there are differences in the treatment of the encodings, whether they are now sent as IPv6 signal data or as user data. This has been recognized by the present disclosure and accordingly encodes data in the IPv6 format. One of the contributions is that the payload data is coded in the IPv6 header instead of the payload section.

Another technical advantage of embodiments of the present invention is that information can be hidden in the IPv6 datagram. As information can be coded in the header or extensions headers a fraudulent user does not expect information to be coded here but rather expects signaling data rather than payload data.

Embodiments of the present invention develop technical aspects of the application domains of IPv6 further in the direction of addressing hardware and providing specific hardware configurations. It has been surprisingly found out that IPv6 provides several technical advantages over the prior art when addressing and configuring machines as the concepts can largely contribute to an advanced addressing of machines over the network as the IPv6 addresses can be distributed over existing networks at great speeds and moreover very reliable.

Moreover, IPv6 provides technical advantages over previous versions such as IPv4 for instance when it comes to coding information. Embodiments of the present invention aim at configuration of hardware modules in a unique way such that each component can individually be addressed, not over a broadcast, which is of such efficiency regarding latency that the addressing of components can be performed at real time. Hence, hardware being security relevant is addressed almost immediately surprisingly making real time applications possible such as autonomous driving or precise control of manufacturing robots.

The protocol used for the underlying scenario is more efficient due to some design specifications for instance the size of packages may be reduces by leaving out optional header fields. Embodiments of the present invention enhance the scope of known protocols such that huge amounts of machine readable languages can be processed and communicated over a network.

Embodiments of the present invention model raw data as computer networks and retrieves information using such network technology. For instance dependencies can be modelled as a computer network, where concepts and relations are modelled as network components. In case a relation between two concepts is modelled then each concept as assigned an IPv6 address and the relation is likewise assigned an IPv6 address. When the network is operated it can be found out how often relations are used. For instance if a relation is mentioned in raw data the network can send packages from concept one to concept two over the relation. For instance if the raw data provides an occurrence of person 1 works for person 2 three components each holding an IPv6 address are created. In every occurrence of this relation data packages are sent over the network components. This relation is modelled once and the network path is operated at each occurrence, for instance in several websites. The network can then be analyzed a load balancing can be performed such that the same relation is modelled by another relation. This allows analysis of concepts based on hardware components. In this way also training data for artificial intelligence applications can be created and analyzed.

According to a further aspect of the present invention the compensation is performed using path routing of data packages. This provides the advantage that different relations are identified using scalable network technology that express the same relation. In this way training data for AI applications can be analyzed using hardware components.

According to a further aspect of the present invention the network comprises virtualized hardware components and hardware components that build up and operate the network. This provides the advantage that the analysis can be carried out using scalable network resources and the method can be carried out at great speed even if underlying data sets are large.

According to a further aspect of the present invention runtime parameters of the network are measured to indicate asymmetric values and reoccurring asymmetric patterns. This provides the advantage that in case a relation is computed slowly an alternative path maybe found. If for instance dataflow over a triple of IPv6 addresses modelling a relation is performed in an unexpected way this may be caused by an overload. Hence, an alternative triple is defined providing the same information indirectly.

The number of appearance can be stored in the address block or the extension headers of an IPv6 datagram. Both the sender and the receiver shall agree on the underlying format in order to be able to interpret the provided data.

According to an aspect of the present invention the number of appearance is stored in an extension header or at least one address block of the datagram. This provides the advantage that the information can be coded in optional data fields and can hence be transmitted with the IPv6 datagram. As indicated above the IPv6 packages may be treated differently by network components and hence an alternative way of representing and transmitting data is suggested.

According to a further aspect of the present invention the number of appearance provides configuration parameters for the machine device. This provides the advantage that the device can be configured using IPv6 datagrams. The payload can be used and moreover data specified in the hexadecimal system is used. This offers a wide range for additional provision of data.

According to a further aspect of the present invention a database is provided indicating further processing information about the number of appearance. This provides the advantage that the receiver obtains information on how to handle and interpret the received data.

According to a further aspect of the present invention a sequence number is provided in the IPv6 diagram. This provides the advantage that in case packages are delivered that form a control flow or a sequence of configuration data this flow can be rearranged to retrieve the originally intended order.

The present disclosure suggests a computer implemented method for automated parameter specification from raw data which extracts the parameters from any kind and type of raw data. This refers to the existence of the data in any format as algorithms can be applied for feature extraction. Hence no human ado is required and the method can run automatically. Summarizing this there is the technical advantage that not only textual information is processed but any kind of raw data can be analyzed.

Using the gathered data an efficient database population is performed as firstly the textual object entities can be stored without any effort and secondly the measurement parameters can be computed and likewise be stored. Accordingly, the data is gathered automatically and the required data can directly be stored for further usage.

In a step according to an aspect of the present invention performing data import from a developing distributed heterogeneous data source is accomplished. The distributed data source may be provided through a network and may be formed by a single database or several databases. Heterogeneous refers to the fact that any data source and any type of data can be used according to embodiments of the present invention. The data source may be provided by the internet providing all kinds of different data being stored on different servers and being transmitted using several network components. The data source develops in its contents as typically information is added, deleted, amended or somehow changed. Hence, at any point in time the content of the data source is different from a further point in time. The data source is hence dynamic and developing. This implies that evaluating the data source time delayed typically never leads to the same results.

One further contribution is the step of extracting object entities from different raw data formats and storing these object entities as textual object entities in the suggested context. Known procedures do not consider heterogeneous data sources but merely read out an existing database. Embodiments of the present invention import the object entities from text, images, sound, video or any meta data file and stores them in textual form. For data extraction existing techniques can be applied such as natural language processing and/or pattern matching. An object entity may for instance be present if a specific person is identified in an image. In case the image is embedded in a text file not only the text as such is analyzed but the image can be searched as well. For instance, pattern matching can be used for identifying persons, things, behavior in case the object are observed as interacting objects or identifying any real-world concept. The result of this is a rich data collection of textual objects and their relations.

The textual object entities each comprise a time stamp for documenting a version of the object entity and an internet protocol address for addressing the object entity. In this way different object entities can be distinguished and uniquely addressed. In case an object entity is related to an event this can likewise be expressed using the time stamp. In case the same object entity changes over time the version can be read out using the time-stamp. Several different object entities can be distinguished by their time-stamp and internet address even in case they carry the same textual description.

Moreover, extracting respectively at least one object entity property for each of the object entities from the distributed heterogeneous data source is performed. In this way the objects can be further described and can be enriched by their describing attributes. A property can be any information relating to the underlying object entity which further describes the object entity. Based on these properties the object entities can be set into relation. Generating relations between the stored textual object entities is performed as a function of the at least one extracted object entity property. In this way the object entities can be clustered or generally set into relation using the characteristics. They may be in relation by means of a causality in case, for instance, one object interacts with a further object. They may be of the same type, category, behavior, attribute and further more. In this way relations can be identified and the object entities are related according to their general context.

Based on the above concepts calculating statistical measurement parameters for describing the textual object entities, the object entity properties and the generated relations is performed. Hence, further information is extracted indicating cardinalities, number of occurrences, statistics of any mathematical measurable behavior and the like. The method considers any information about object entities, the object entity properties and the generated relations such that they can be expressed in numbers.

The resulting measurement parameters are stored as a first measurement parameter set while repeating the above steps time delayed is performed. The distributed heterogeneous data source develops and stores resulting measurement parameters as a second measurement parameter set. This makes use of the developing meaning changing data source which is amended over time. As indicated above the information source is enhanced or content is deleted or at least changed. In this way different results are to be expected depending on the time delay which again affects the content of the developing data source.

After that extracting deviations in the second measurement parameter set from the first measurement parameter set is accomplished such that the dynamics of the underlying data source can be expressed. In this way one can see where changes take place and how such changes affect the extracted object entities. The dynamics of the underlying data source can not only be extracted and identified but rather numeric measurements can be provided indicating the scope of the changes and dynamics.

As it is of interest how such dynamics evolve over time extrapolating the extracted deviations to predict future measurement parameters is performed. In this context it can be suggested that past patterns in history repeat and hence a prediction is possible as the learned patterns are applied on current data. This simulates the behavior and extracts future scenarios. For prediction it may be of advantage to evaluate the data source several times, thereby extract object entities, their properties and relations and compare the resulting parameter sets. The time delay can be customized in any direction. Accordingly, equidistant time distributions are possible or individual time periods. This allows the adaption of the frequency of creating parameter sets. The more data is extracted the better may be the predictions computed by the suggested method.

According to a further aspect of the present invention compensation is performed using path routing of data packages. This provides the advantage that different relations are identified using scalable network technology that express the same relation. In this way training data for AI applications can be analyzed using hardware components.

According to a further aspect of the present invention the network comprises virtualized hardware components and hardware components that build up and operate the network. This provides the advantage that the analysis can be carried out using scalable network resources and the method can be carried out at great speed even if underlying data sets are large.

According to a further aspect of the present invention runtime parameters of the network are measured to indicate asymmetric values and reoccurring asymmetric patterns. This provides the advantage that in case a relation is computed slowly an alternative path maybe found. If for instance dataflow over a triple of IPv6 addresses modelling a relation is performed in an unexpected way this may be caused by an overload. Hence, an alternative triple is defined providing the same information indirectly.

According to an aspect of the present invention extracting object entities from different raw data formats comprises at least one technique of classification, natural language processing, stemming, computational learning, artificial intelligence, operating a neuronal network, pattern matching, voice recognition, image processing and/or data analysis. This provides the advantage that any combination of the aforementioned techniques can be applied and hence any kind of data can be used to extract the full semantic content of the raw data. For instance, images can be analyzed and respective object entities along with their properties can be extracted. Such information can then be processed using clustering, wherein all object entities are considered no matter whether they are derived from text or an image.

According to a further aspect of the present invention extracting respectively at least one object entity property comprises identifying at least one of a time-stamp, a period of time, an instance, a class, an object entity property, an object behavior, an object function, a subject, an verb, an object, a cardinality, a causality, a tuple, a triple, a cause and/or an effect. This provides the advantage that the object entities can be described in their entireness and every aspect of an object entity can be modelled. In this way a semantically rich data set arises and the real world can be modelled in great detail. For instance, a behavior of an object entity can be identified if any action is described in the underlying data source which is performed by an object entity or the object entity is treated with. For extracting such a behavior even images and voice files can be considered.

According to a further aspect of the present invention generating relations comprises at least one technique of clustering, classification, artificial intelligence, natural language processing and/or evaluation of entity properties. This provides the advantage that relations can be detected in case objects and/or their properties belong to the same cluster or class. Moreover, relations may be presented by natural language which can be mined as well. Different relations can be extracted depending on the used perspective and hence different object entity and properties can be used. As an example, it is indicated that a selection of properties of a first object entity may be compared to a selection of properties of the second object entity.

According to a further aspect of the present invention statistical measurement parameters comprise at least one of a cardinality, a distribution, an asymmetric shift, a normalization history, a time-series, a baseline, continuous quantitative measurement parameters, a data fluctuation, a cluster, a class, a deviation and/or a mathematical parameter. This provides the advantage that the behavior of the semantics of the data source can be completely measured in its entireness and any statistical function can be applied, even in combination. This models the dynamics of the data in a wholistic way and allows fine grained assertions.

According to a further aspect of the present invention the distributed heterogeneous data source develops by at least one operation of adding, changing, updating, enhancing, deleting and/or modifying an information item. This provides the advantage that any function can be applied to the data source. Typically, the data source is provided by the internet, where huge numbers of users and content creators interact and jointly modify data. These dynamics can be extracted by the suggested method and visualized accordingly.

According to a further aspect of the present invention the method is performed iteratively and the extrapolating is performed using several deviations. This provides the advantage that the data source can be analyzed at different points in time and the evolving data sets are considered. Hence, the dynamics even of large-scale data sets can be extracted and examined over time. The more often the method is repeated the more complete is the resulting model and fine-grained assertions can be drawn from different deviation histories. Iterating the method steps typically results in a parallel computation of the method steps.

According to a further aspect of the present invention extrapolating is performed using at least one of a mathematical function, applying an ontology, applying artificial intelligence, applying a history database and/or applying predictive technologies. This provides the advantage that predictions can be mode even by combining several techniques and that learned history patterns can be applied to predict future changes. For instance, an ontology can be applied for identification of same semantics expressed by different words or by providing clusters of a same technical field. In case the technical field is modeled by an ontology, sub-topics can be identified and hence it is possible to identify that changes head towards a specific technical trend. In case articles referring to neuronal networks, big data and machine learning increase in their number the trend of artificial intelligence is identified.

According to a further aspect of the present invention the method is performed for a selection of object entities provided through a user interface. This provides the advantage that the number of technical fields is limited by a user. Typically, a user is not interested in the whole content of the data source but rather chooses a specific perspective indicated by the selected object entities. In this way only topics of interest are examined and respective future scenarios are extracted. The user may select topics of interest and accordingly the corresponding object entities are selected.

According to a further aspect of the present invention a threshold is applied for exclusion of measurement parameters. This provides the advantage that in case no significant semantics are expressed by specific parameters they are not further considered. This saves computation time and power. As the underlying data sets are huge not every single parameter can be considered but only those of significant impact.

According to a further aspect of the present invention the distributed heterogeneous data source describes a hardware configuration. This provides the advantage that independent of any applied hardware configuration large data sets can be examined no matter how they are physically stored and computed. Different hardware configurations can be abstracted and the data source is examined using at least one interface.

According to a further aspect of the present invention internet protocol address is an IPv6 address. This provides the advantage that the object entities can be uniquely addressed and the communication can be performed using a network such as the internet. In this way existing hardware infrastructures can be reused and protocol implementations can be used. Moreover, the IPv6 address space is big enough to support unique addressing of large quantities of data sets.

The object is also solved by a system arrangement for automated parameter specification from raw data and efficient database population, comprising the steps of an import interface arranged to perform data import from a developing distributed heterogeneous data source, thereby being arranged to extract object entities from different raw data formats and store these object entities as textual object entities each comprising a time stamp for documenting a version of the object entity and an internet protocol address for addressing the object entity; an analysis unit arranged to extract respectively at least one object entity property for each of the object entities from the distributed heterogeneous data source; a processing unit arranged to generate relations between the stored textual object entities as a function of the at least one extracted object entity property; a calculation unit arranged to calculate statistical measurement parameters for describing the textual object entities, the object entity properties and the generated relations and storing resulting measurement parameters as a first measurement parameter set; a triggering unit arranged to repeat the above steps time delayed while the distributed heterogeneous data source develops and being arranged to store resulting measurement parameters as a second measurement parameter set; and an computing unit arranged to extract deviations in the second measurement parameter set from the first measurement parameter set and extrapolate the extracted deviations to predict future measurement parameters.

The object is also solved by a computer program product comprising instructions to cause the arrangement to execute the steps of the method as well by a computer-readable medium having stored thereon the computer program.

It is of special advantage that the method as suggested above can be executed using structural features of the suggested device and control unit. Accordingly the method teaches steps which are arranged to operate the suggested device. Furthermore, the device comprises structural features allowing the accomplishment of the suggested method. In addition a computer program and a computer program product respectively is suggested comprising instruction which perform the suggested method when executed on a computer or the device according to embodiments of the present invention. Furthermore, the instructions provide means for implementing the structural features of the claimed device. Accordingly an operable image of the structural features of the device can be created. Likewise an arrangement comprising the structural device features is provided.

Wherever structural features are provided they can likewise be established virtually thereby creating a virtual instance of physical structures. For instance a device can likewise be emulated. It may be the case that single sub steps are known in the art but the overall procedure still delivers a contribution in its entireness.

BRIEF DESCRIPTION OF THE DRAWINGS

Further advantages, features and details of the invention emerge from the following description, in which aspects of the invention are described in detail with reference to the drawings. The features mentioned in the claims and in the description can each be essential to the invention individually or in any combination. The features mentioned above and those detailed here can also be used individually or collectively in any combination. Functionally similar or identical parts or components are in some cases provided with the same reference symbols. The terms "left", "right", "top" and "bottom" used in the description of the exemplary aspects relate to the drawings in an orientation with normally legible figure designation or normally legible reference symbols. The aspects shown and described are not to be understood as conclusive, but are exemplary for explaining the invention. The detailed description is provided for the information of the person skilled in the art; therefore, in the description, known circuits, structures and methods are not shown or explained in detail in order not to complicate the understanding of the present description. The invention will now be described merely by way of illustration with reference to the accompanying figures, which show:

FIG. 7 showing a step of building a matrix according to an aspect of the present invention;

DETAILED DESCRIPTION

Figure 1:
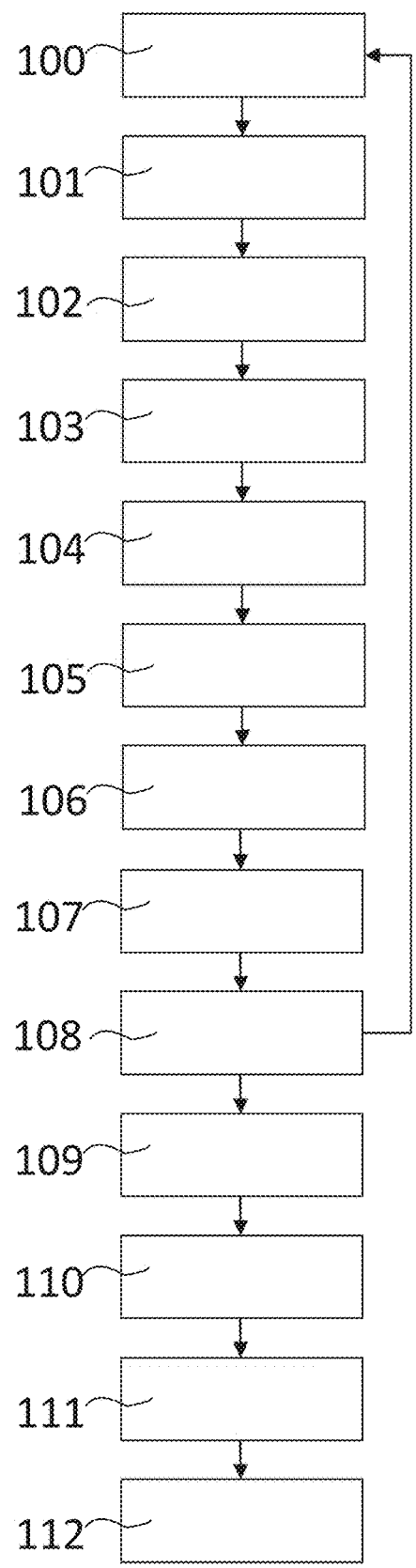
FIG. 1 showing a flow chart of a computer implemented method for automated parameter specification from raw data and efficient database population according to an aspect of the present invention.

FIG. 1 shows a method for hardware based package analysis for interpreting data sources, comprising the steps of performing 100 data import from a developing distributed heterogeneous data source, thereby extracting 101 object entities from different raw data formats and storing 102 these object entities as textual object entities; extracting 103 respectively at least one object entity property for each of the object entities from the distributed heterogeneous data source; generating 104 relations between the stored textual object entities as a function of the at least one extracted object entity property; assigning 105 a unique IPv6 address to respectively each object entity, respectively each object entity property and respectively each relation; forming 106 an at least partially hardware based computer network, wherein each object entity, each object entity property and each relation is represented as a network component being addressable by the respective IPv6 address; operating 107 the network by sending at least one package over the network between the network components at the occurrence of respectively one of the object entity, object entity property or relation in the heterogeneous data source; calculating 108 statistical measurement parameters for describing a dataflow in the formed computer network and storing resulting measurement parameters as a first measurement parameter set; repeating 109 the above steps time delayed while the distributed heterogeneous data source develops and storing 110 resulting measurement parameters as a second measurement parameter set; and extracting 111 deviations in the second measurement parameter set from the first measurement parameter set and extrapolating 112 the extracted deviations to predict future measurement parameters.

The person skilled in the art will appreciate that individual method steps can be carried out iteratively and/or in a different order.

In the further description set forth below the invention is described by specific aspects, which can be combined in the described way, where some aspects are optional and merely for demonstration purposes. An aspect of the invention is named C+8, which refers to the suggested subject-matter. Circumplex and C+8 refer to the present invention implying the principle of causality and 8 kinds of object entities:

1. Causality: The object Causality is understood as the relation between an event and a second event, where the second event is understood to be a consequence of the first. Causality is also the relation between a set of factors (properties, behaviors, functions) and other such phenomena. Causality is a prime feature of C+8 and cannot be substituted.
2. Event: An event is the fundamental entity of observed physical reality represented by a point designated by three coordinates—an action, a place, and a time within the space-time continuum.
3. Concept: A concept is an abstract or generic idea which becomes defined through specific instances and generalized through associating multiple instances.
4. Group: A group is zero or more elements forming a complete unit in a composition, or a number of individuals, objects, or abstract units which are either assembled together or have some internal unifying relationship, including being regarded by an external observer as a unit through a defined concept. The membership of any object to become belong to a Group is often determinate by the organizing concept of the group, for example a theme of membership or a commercial organization such as a Corporation or Association.
5. Person: A person as a cardinal object in C+8 is a real human individual, but also includes the projection of a technological element designed to resemble a human with all its functions and properties, for as long as it stays undetected as technology. Imaginary persons are either Concepts (if virtual) or simply objects (if physical).
6. Geography: A geographical object constitutes the description, distribution, or interaction of any location, whether it be definite, abstract, or metaphorical.
7. Time: As a cardinal object, time is the measured or measurable moment or period during which an action, process, or condition begins, exists, continues, or ends; a nonspatial continuum that is measured in terms of events that succeed one another from past through present to future. Time can be referred to as either a hard and precise measurement by using a clock, for example, or as a soft measurement through a general description of one or more time periods.
8. Physical Object/Thing: A physical object is a material thing, real or perceived through abstract understanding, that includes all living things except what is defined above as a "Person".
9. Technology: A technology object is any object, its system, or behavior which came into existence willfully and purposefully through the application of individual or systemic intelligence by a natural or artificial agent with the specific goal of providing a solution to a problem or increasing the efficiency of a particular process.

The world has evolved into a digital place that constantly generates data. Everything one does and everything one creates produces inconceivable amounts of data that grow exponentially. With the rapid adoption of connected sensors and Internet of Things (IoT) devices, we will soon reach a point where we will generate as much data in a single day as we have in our entire history. Humans are grappling with the challenge of organizing these vast amounts of data into databases for the purpose of creating analyses and analytical and transactional applications. Increasing requirement for storage is a challenge, but since capacity is linearly correlated with quantity, data storage is a minor issue. The real challenge is data retrieval within a specific context and purpose. Using search mechanisms, AI-based software accesses big-data pools and processes them—the larger the data volume, the greater the computational horsepower required. Unlike storage, the computational horsepower is exponentially correlated with the amount of data and by continuing on this path, we are quickly reaching a point where we may never be able to understand and realize the full potential of this data. This is the fundamental reason we must find new approaches and rethink digitalization and "big data" processing.

"Big data" is a field that treats methods of analysis, systematical information extraction, or any other dealings with data sets that are too large or complex to be dealt with by traditional data-processing application software. Data with many cases (rows) offer greater statistical power, while data with higher complexity (more attributes or columns) may lead to a higher false discovery rate. The field's challenges include data capture, storage, analysis, source, search, sharing, transfer, visualization, query, update, and information privacy. Big data was originally associated with three key concepts: volume, variety, and velocity. When handling, we cannot sample it, we simply observe and track what happens. Therefore, it often includes data with sizes that exceed the capacity of traditional software to process within an acceptable time and cost limit.

The human brain links and processes huge amounts of data every second of every day. To do this, it uses neurons that learn, calculate, and communicate independently, but are in constant interaction with each other, basically creating intelligent information. Based on this, the inventors have developed the C+8 data model, which is an aspect of the present invention; a method in which data organizes itself completely autonomously. Through it, thousands of terabytes of unstructured data are processed and immediately stored as intelligent data. This results in continuously growing amounts of natively arranged dynamic data records that digitally map the real world, its behavior, and its correlations. Over time, this produces a continually evolving model of intelligent data that is mutually and autonomously associated through joint connections creating a 45-dimensional knowledge network. By opening up new perspectives, unknown correlations, and unbiased analyses, we gain new insights, forecasts, and aids to enable evidence-based decision-making at an unprecedented level. With the advent and continual evolution of AI, the data science and information technology industries are facing more and more complications due to various foreseen and unforeseen factors that influence the outcome, success, and quality of their products.

These complications are partly due to the fact that, so far, the emphasis has been on replicating the function of the real world through technology. As technology mimics the mechanism through which humanity functions and evolves, the nuances of language, culture, religion, etc. have been observed and processed, however, the emergent, high-order interactions which define the societal dynamics have been largely ignored. We live in one world with a single network of objective truths, but in this one world and single network of objective truths there are billions of contradictory views, opinions, agendas, realities, strategies and preferred futures which can trace their origins to a multiplicity of agents with misaligned incentives. Issues such as operator bias, problems with validating AI processes in big-data, systemic built-in blind spots, clinical data handling, limitations in current big-data information models, unrecognized information vacuums, sub-optimal weak signal detection, problematic handling of contradictory outputs, and the lack of data standards in the handling of unstructured data, all of which contribute to sub-par analytical solutions.

Technology provides the solution to the above-mentioned issues through its very structure and method of functionality. It is a knowledge system that is fully generalized, self-evolving, and machine-to-machine standardized. It is self-organizing, operator bias-free, and functions fully while completely unsupervised. It is auto-analytical and provides complete, transparent access to all of its available knowledge. To answer complex questions correctly and to make the right decisions without missing any information or contextual preconditions using AI as a decision support system, one must develop a continuous, intelligent, dynamic, and real-time decision-making environment which builds the processing and problem-solving fabric using all information, all behavior, all functions, and all shapes and appearances that become accessible in our known world.

Embodiments of the present invention use this knowledge framework to study causality phenomena in our sustained, highly qualified, and successful effort to understand the evolution of the world in our times. Since the system is abstracted to the degree of the 'information atom' the generalized framework of tools the inventors have built to use the knowledge generated by C+8 can be applied to any subject domain. The user has free rein to select time intervals and any or all of the C+8 atomic elements that need to be observed using each tool, in order to define the elemental properties of a problem, and to create a corresponding solution. In the herein described technology, the real world is observed, recorded, and streamed in real time into the dynamic global C+8 sandbox. The most important aspects of this sandbox are that it is generalized, auto-associative, standardized, unsupervised, completely self-organizing, and operator and confirmation bias-free. It captures evolving facts, realities, interactions, and associations together with all the other dynamic changes of the real world, and it does so 24/7/365.

Observation in this context means absolutely any form of digital information harvesting, such as web crawling, text mining from digital sources, measuring through sensors (for example using a thermometer to obtain a digital temperature reading Celsius at time y at location x), taking digital pictures and video, recording sound and speech, or measuring radioactivity with a Geiger counter at a specific time and location.

A generalization is the formulation of general concepts from specific instances by abstracting common properties. Generalizations posit the existence of a domain or set of elements, as well as one or more common characteristics shared by those elements (thus creating a conceptual model). As such, they are essentially the basis of all valid deductive inferences. Generalization within the C+8 context is the process of identifying the parts of a whole as belonging to the whole. The completely unrelated parts may be brought together as a group (belonging to the whole) by establishing the existence of a common relationship among them through layers of frames of reference.

Traditional applications store data at a unique address and can recall the data upon presentation of the complete unique address. Auto-associative applications in C+8 Technology are capable of retrieving a piece of data upon presentation of only partial information from that piece of data. Association in C+8 is recalled and processed through recorded memberships of instances of events and causality within these events, however discreet. Being observed as any real or abstract object within the context of an observed Event is the minimum requirement to become associated with such event.

Standardization is the process of implementing and developing technical standards based on the consensus of different parties that include firms, users, interest groups, standards organizations, and governments. It maximizes the compatibility, interoperability, safety, repeatability, and quality of a systemic data operation between computers. Beyond the ability of two or more computer systems to exchange information, the semantic interoperability 10 of C+8 is the ability to automatically, meaningfully, and accurately interpret the information exchanged in order to produce useful results as defined by the end users of both systems. To achieve semantic interoperability, both sides refer to a common information exchange reference model. The C+8 system provides such an associative and interpretative environment.

An unsupervised and self-organized storing of information and its associative structures imposed through the C+8 tools aids in finding previously unknown patterns in data sets without using preexisting labels. It allows the modeling of probability densities of given inputs. In this way, C+8 provides cluster analysis which causes unsupervised learning to group or segment datasets with shared attributes in order to extrapolate discreet causal relationships. Cluster analysis is a branch of machine learning that groups the data that has not been labelled, classified, or categorized. Instead of responding to feedback, C+8 cluster analysis identifies commonalities in the data and reacts based on the presence or absence of such commonalities in each new piece of data. This approach helps detect anomalous data points that do not fit into either group. A central application of C+8 unsupervised learning is in the field of density estimation through quantitative statistics.

Semantic interoperability is the ability of computer systems to exchange data with unambiguous, shared meaning. It is a requirement to enable machine computable logic, inferencing, knowledge discovery, and data federation between information systems.

Density Estimation is the construction of an estimate, based on observed data, of an unobservable underlying probability density function. The unobservable density function is thought of as the density according to which a large population is distributed; the data are usually thought of as a random sample from that population. A variety of approaches to density estimation are used, including Parzen windows and a range of data clustering techniques, including vector quantization. The most basic form of density estimation is a rescaled histogram.

Whenever we talk about probability density function (PDF) in C+8, or density of a continuous random variable, we mean a function whose value at any given sample (or point) in the sample space (the set of possible values taken by the random variable) can be interpreted as providing a relative likelihood that the value of the random variable would equal that sample. In other words, while the absolute likelihood for a continuous random variable to take on any particular value is 0 (since there are an infinite set of possible values to begin with), the value of the PDF at two different samples can be used to infer, in any particular draw of the random variable, how much more likely it is that the random variable would equal one sample compared to the other sample. In a more precise sense, the PDF is used to specify the probability of the random variable falling within a particular range of values, as opposed to taking on any one value. This probability is given by the integral of this variable's PDF over that range—that is, it is given by the area under the density function but above the horizontal axis and between the lowest and greatest values of the range. The probability density function is nonnegative everywhere, and its integral over the entire space is equal to one.

The observer-expectancy effect (also called the experimenter-expectancy effect, or expectancy bias, observer effect, or experimenter effect) is a form of reactivity in which a data operator's cognitive bias subconsciously influences the results of analysis. Such confirmation bias will always lead to an incorrect interpretation of results, due to the tendency to look for information that conforms to a previous hypothesis, therefore, overlooking information that argues against this previous hypothesis. The internal validity of any analysis is significantly threatened by this bias.

C+8 tools shield the system from it completely by disallowing any human operator to identify, classify, or special-case any part of the data. C+8 uses the same methods and generalized analysis tools across all data and has no expectations built into its analytics processes, except those which the system itself learns through general statistics.

In order to build a dynamic electronic sandbox of the world, we must replicate the processes of the human brain, because it is the most efficient way to put into context large amounts of information, and, it is native to our own way of thinking and understanding. At its core, the principal activity of the human brain—and the source of its intelligence—is its ability to detect patterns; and it is amazingly efficient at this. The tools our brain uses are neurons and receptors through which sensations are felt and stored—the brain can only perceive things through senses (touch, smell, taste, etc.). The complexity (and wonder) of the brain arises as an emergent property of the interaction of simple pattern detection operations. With time, the brain stores more and more seemingly sophisticated knowledge, but when we break it down, the architecture is actually rather simple and very logical.

Humans learn through their senses (data gathering) and associations (data processing), and this is exactly what the present invention has built within C+8. The human brain includes a sandbox of the universe, functionally equivalent to a human brain, except that instead of only containing the data found in one human brain, C+8 operates a system that imports the collective data found in billions of people's brains. C+8 borrows the methods that the brain uses to function, it builds a sandbox exactly like the human brain does—through observation and association—but it relies on the brains of all of humanity. In our system, we ask in the end only four basic questions; what was, what is, what will be, and what would be if we change x for y. These questions and their subsequent answers, bound by the Arrow of Time, encompass all the needs and desires of humanity.

Any object of the real world can, and often is defined as more than one Cardinal Object and is dependent on the definitions within a given instance of the C+8 recorded universe. These 9 objects (Causality+8 Elements) are recorded in passports (one passport for each unique object) in combination with instances, properties, functions, behaviors, associations, and event timelines which are relational databases that describe how objects/entities live inside the C+8 environment. (A unique object would be, for example, Abraham Lincoln's first dining room table, and its passport would contain all available information about that particular table—when it was acquired, where it came from, the locations it was placed in, etc.) A knowledge object is defined by its instances, properties, functions, behaviors, and associations.

An instance is a concrete occurrence of any object/entity in our system. Each instance emphasizes the distinct identity of the object/entity in the context where it occurred. Each instance is assigned its own IPv6 number and is recorded in the global register.

A property of an object in the suggested system is an intrinsic or circumstantial characteristic of said object/entity. Each property describes the object/entity, so as to make it definable and identifiable across any environment. The combined set of properties describe the features, in how the object was observed by all observers, which may be different from how an object actually is. Typically, one should assume, that the more independently recorded observations exist, the more accurate the description of the object over time generally should become. This also allows for implementation of a generalized scoring system of observer, and the observed: Firstly, the more independently observed features of the same type or value are recorded from an increasing number of different observers increase the probability of objective truth about the underlying object, and secondly, the more observers observe properties or values within the highest density of plotting of all observations, the more an observer can be trusted, that its observations are near the truth; especially for all such cases, where only a limited amount of observational data exists.

Functions are roles or purposes that have been observed in relation to an object by the C+8 system. Functions are what the underlying object/entity does, or how it is changed or what effect to other objects it produces in the context where it was observed or in which the function is produced.

Behavior describes how the object/entity acts in its original environment and how its actions change when the environment changes. For example, when a new behavior is detected, such as "kill," it gets an IPv6 number, and whenever "kill" is detected again, all the information is recorded under the original IPv6 number. When the system is asked when has the behavior "kill" been associated with some Person (x), for instance, it will return all the data it has for this combination. (This is the way the brain functions, and there is presently outside of C+8 no other system that can reproduce such results instantly and efficiently).

By using observations (new data) to link an object/entity to other objects/entities through shared descriptors (behavior, functions, properties, instances and time), the C+8 system acquires more descriptive and more in-depth knowledge about both the entities and the world generally. By using the structures of time relations in C+8, the system and its users gain understanding of the sequential occurrence of observed reality. This is critical to making accurate predictions.

The information web ties all the pieces together. In this example there is a single instance (a news article, a book, a scientific journal, a radio/television broadcast, etc.) together with all the elements contained in that instance: one or more of each cardinal object, each with its own passport. If C+8 recognizes an object as having been previously mentioned, the passport for that object is retrieved. All the C+8 objects are always related to each other by instance, but they can also become related through vertical object views cross multiple instances. For example, an object 'Person' observed at the same object 'Geography' a conference room, at the same object 'time' sharing the same object 'Concept' annual board-meeting, and object 'Group' Acme Corporation, become related with another person, sharing the same other objects, but retrieved from different instances.

An additional aspect of the nine cardinal objects is the fact that each can be viewed vertically. This means that you can take any object and see all the data that is available about that particular object—its associations, the events it took part it, where it was, when it was there, what it did or what was done to it, and so on. This is called the vertical multi-world representation.

In order to create bias-free self-predictive smart data, there are 11 steps that must be followed. The first 6 steps are the constructive process—when building the sandbox, we first construct the associative data model based on the real world. The next 5 steps are the observational process, which are necessary in order to understand what is happening on all possible levels. All these steps contribute to creating real-time predictions from continuously incoming data, predictions that can be viewed using our specially designed tools.

I. Import Data

First, we import raw, unstructured data files (video, images, text, etc.) also known as instance. Metadata is created and time-stamped, instance records are generated, and an IPv6 number is assigned to the newly created objects. In this way we record everything we can hear, see, read, touch, sense, or otherwise observe in the real world in any possible but reliable way (by humans or machines) and store it in a raw data depository.

Currently Prisma Analytics collects data from over 42,300 major aggregation sources. Some examples of these sources are Reuters News, AP, DPA, CNN, FOX, Google, Science and Technology, News, The American Scientist, Financial Times, New York Stock Exchange, IMDB, Library of Congress, RT, China News, Twitter, Global Research, and over 42,000 more.

II. Entity Parsing

The next step is entity parsing. The C+8 system parses the raw data into triples with a subject-verb-object format. This step retrieves initial information elements and structures from raw data. The specific entities or objects which become preserved from these information elements in the C+8 System are Events, Persons, Groups, Geography, Concepts, Objects of Time, physical Objects and Objects of Technology. Each extracted object is subject to disambiguation by the system using natural language processing in order to ensure best possible identification. Extracting these objects from the raw data later allows us to reconstruct a chronological time-line of their appearance using each recorded instance.

Once parsed, each unique cardinal entity receives a passport. Whenever a new entity is parsed, the global object passport register is checked in order to see if that entity already exists and has a passport; if it does, the passport is updated with the data of the new instance together with the Instance record, its IPv6 and date/time stamps; if it doesn't, a new passport is created with an assigned IPv6 and is recorded in the global passport register.

III. Causality Parsing

Step three is causality object parsing. Causality in C+8 is defined as the relation between an event and a second event, where the second event is understood to be a consequence of the first. In common logic, causality is also the relation between a set of factors and a phenomenon. It is a prime feature of all knowledge and cannot be substituted. Extracting causality from data is the single most important and most rewarding task in the pursuit of Intelligence. In this step, the C+8 system extracts any knowledge object that either fully or partly establishes the existence of cause and effect within the behavior of any C+8 object in any instance of observation. We read causality out of raw data by identifying individual units of causation through Triples (subject, verb, object), which are connected through association to each other and to the objects identified in step II (which are contained within the causation units).

IV. Property, Function, and Behavior Parsing

Objects typically have properties, and they behave or function in some observable way. Each property, function and behavior are parsed from raw data, and recorded; through them we are able to understand how the cardinal objects have been observed, how they behave, how they function, and what their place and transformative influence is in the underlying event timeline.

Each time, a cardinal C+8 object appears in any instance with respect to an observation of a property or behavior, a new record set is created inside the object database, to preserve, who or what perceived what, when and in what instance. This allows over time, to capture even contradictory observations, and therefore a more unbiased and more objective picture begins to emerge.

V. Associative Network Creation

The associative network is created by linking every object to its native instance, to other objects found in the same instance, to the relevant time stamps, to all its respective causations, properties, function, and behavior records through pairs of IPv6 numbers and corresponding time stamps. This create a mesh of network-clusters which recreate the memberships, time-lines, and sub-time-lines of every instance, and every event timeline within.

VI. Visualization of Data Through Special Tools

All recorded instances and extracted C+8 objects can be viewed through our quantitative and qualitative tools to establish fully quality-quantified objects. These objects are measured continually, creating the multi-cube matrix which we will explain shortly in this document.

The Technical Energy Diagram, (hereinafter the circumplex) offers a method of viewing and measuring C+8 data through natural language processing, while our Indicators (shown further below) offers quantitative measurements of occurrence or specific behaviors. The numeric output from both these quantitative measurements is then inserted into the Cube Library, where they feed the statistical models to extract signal information.

The Diagram may illustrate the trends of collective moods on a circumplex, combining sectional measures with longitudinal measures displayed in a panel format. This data processing, visualization, and analysis tool displays polar data combined with trigonometric functions on a geometric space, thus allowing for more than two measurements on the same observation at a single point in time. Using radii, theta, and a circumference, the diagram is a geometric space on which data about collective moods, affects, and emotions is plotted, thus creating a dynamic and complex image of the way an object is perceived by collectives and to what intensity. It goes without saying, that this method of visualization allows one to discover trends and shifts in social energies using very large data sets. The circumplex uses a glossary-based approach: computers run a Technical Energy Glossary and adjacent specialized Glossaries against empirical data, identifying, counting, and extracting glossary entries. These entries are then plotted on the geometrical space.

The Indicators tool is a simple counting mechanism combined with the C+8 query fields (shown on the page above, and to the left), making this simple function a formidable analysis tool. The user introduces what element he wishes to track over what period of time and then refines the search with additional elements such as behaviors or associations, etc. The output is an accurate on-point time series that shows the evolution of the element over the selected time period. This evolution is simply the number of times that element is found in the C+8 data pool over a specific time period in combination with the additional filters the user has specified. For example, a user could specify an <Event>, occurring in all <Geographies>, where conferences are hosted, which have as <Concept> subject Climate Change, and a particular <Group>, which appears as <conference sponsor> (a function/behavior sub-set).

What both these tools have in common, besides the C+8 data behind them, is a highly intuitive query field in which the user introduces the elements they wish to observe over whatever period of time it may be required. This also allows researchers to carry out extraordinarily complex queries, which can be done inside C+8 in seconds and which return a volume measurement whereby each occurrence can reveal the underlying data for details.

VII. Statistical Calculations

The upper layers of C+8 use fully automated statistics engines, which are applied continuously onto all system-generated numerical information. Its purpose is to detect notable asymmetric shifts in its parallel streams of analysis data. To establish various reference points of 'normal' in the continuous quantitative measurements (time-series), the system uses bell curves, FIG. 2. These establish baselines over various time lengths, generating normalization histories. Baselines could be established, for example, over 90 days, 180 days or even over years. This baseline is used as a 'zero point' from which with observed ranges of data fluctuation can be measured. In this way, the system can establish and maintain for comparable objects a generalized definition of 'normal' behaviors within and without expected ranges of variation over some typical lengths of time. By keeping history of change ranges, we can find larger fluctuation trends and correlate them with events and event clusters over various timelines. In this way, we can establish a mesh network of billions of statistical change/time elements, each connected through IPv6 numbers to these dynamic measurements, belonging to a specific object cluster, to determine if it is still functioning within a range of expected 'normal' or has moved away from the 'normal' ranges within the bell curve or histogram, and creates a unusual or asymmetric footprint in the data, however discreet.

VIII. Extract Asymmetric Values Detected in Circumplex Data

Figure 2:
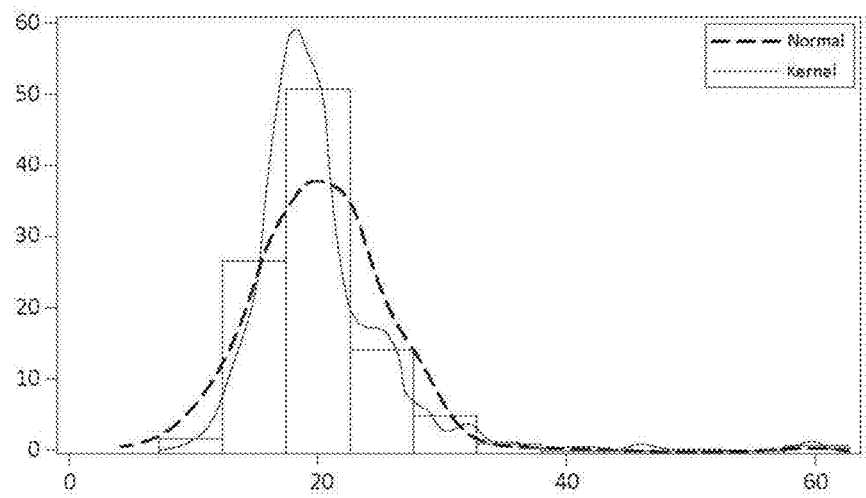
FIG. 2 showing an aspect of asymmetric signal detection according to an aspect of the present invention.

Once we have established a baseline of "normal" and a mechanism to measure departures from "normal" we use them to create cut-off values for weak signals, similar to those used in asymmetric signal detection, for example, see FIG. 2. All the asymmetric values and value ranges (asymmetric meaning, in this case, deviating from the expected or "normal" ranges of quantified behavior and properties) are then extracted from the circumplex and analyzed in comparison to the established "normal" range for each object or set of objects. It is important to note that all ranges, whether they be normal or asymmetrical, are subject to evolution according to their contextual conditions (this being one of the principles of Quantum Relations).

Figure 3:
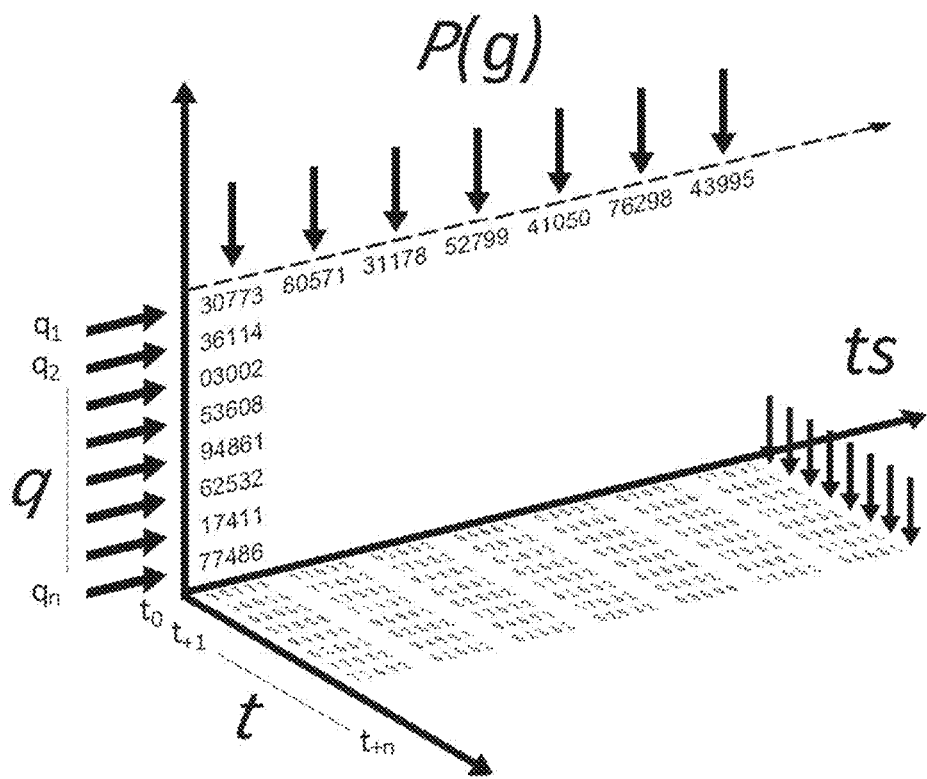
FIG. 3 showing an aspect of data processing in an n-dimensional space according to an aspect of the present invention.
Figure 4:
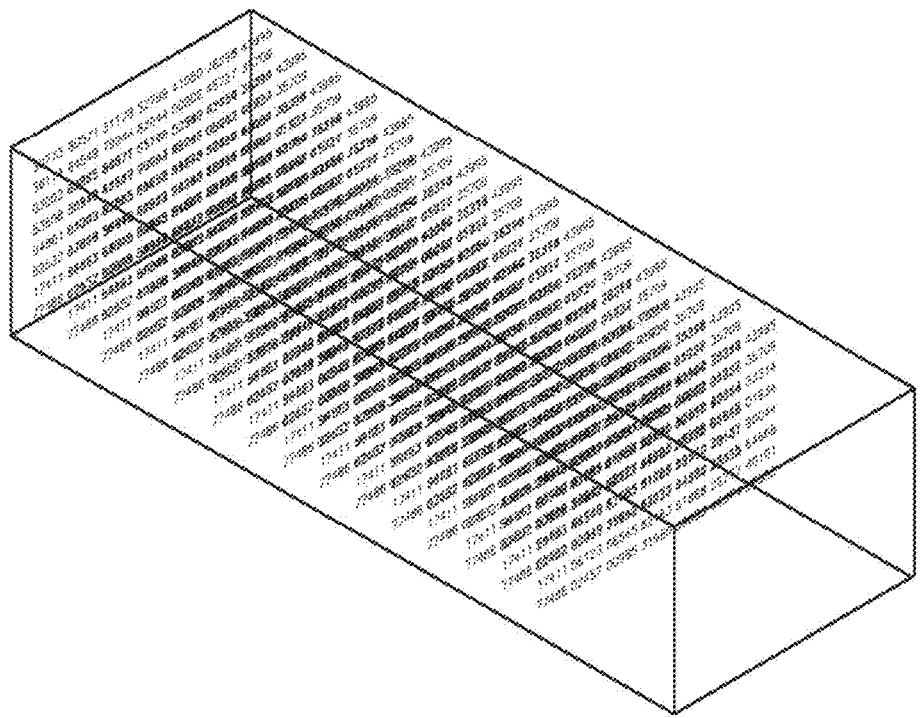
FIG. 4 showing an aspect of data processing in a cube like structure according to an aspect of the present according to an aspect of the present invention.

The C+8 data model makes possible the generalization of time series, something that has not been done before. And this generalized time series model is what, in turn, makes the Cube possible. The Cube is a set of tools and a strategy that can be used to visualize and understand enormous amounts of data in a concise and understandable form. Below is a brief explanation of how a Data Cube is constructed, with all its general elements combined, see FIGS. 3 and 4.

Figure 5:
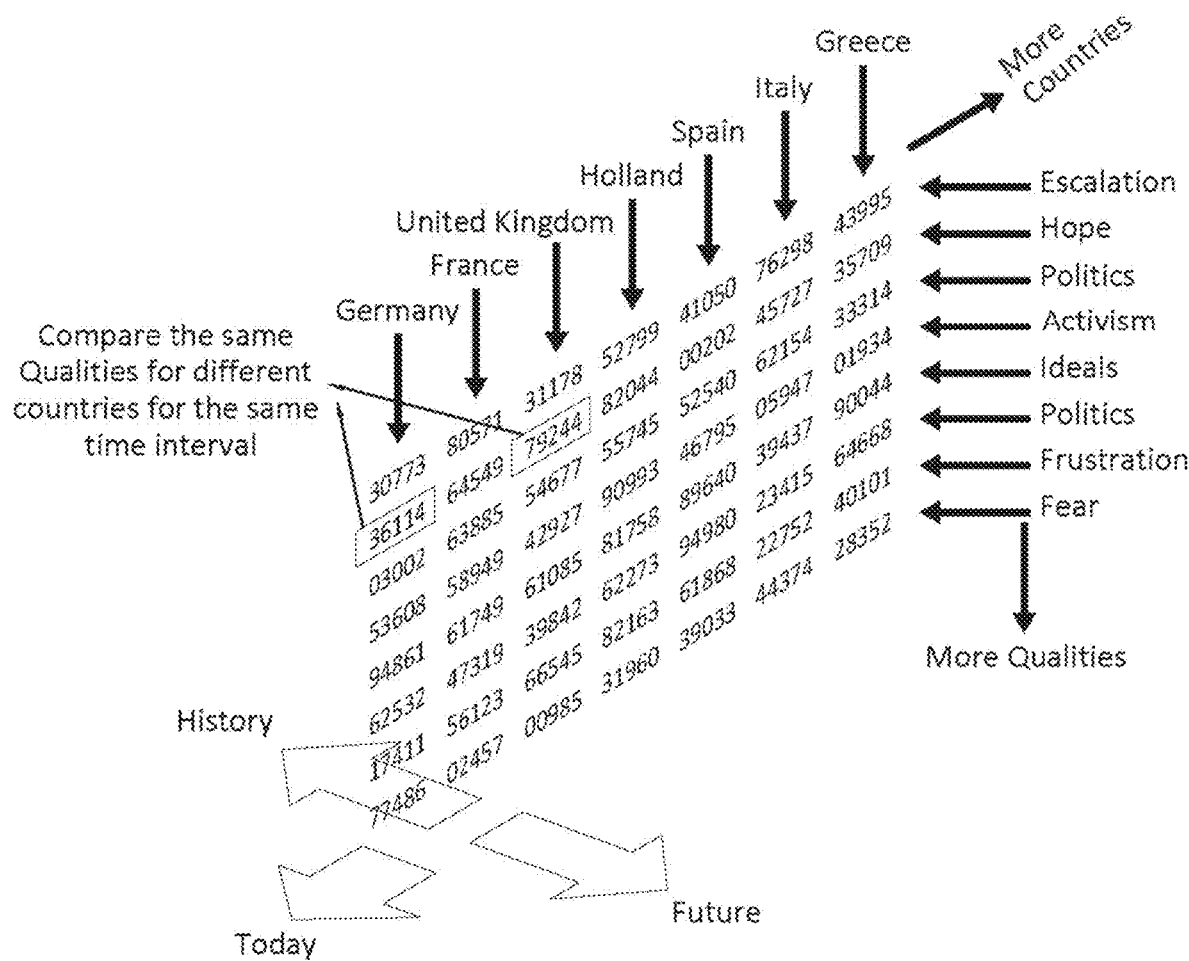
FIG. 5 showing a computation of numerical values according to an aspect of the present invention.

In order to break it down, one can first define the dimensions: P(g)=measurements/queries of the same type (for example, multiple countries, or cities, or companies, or other such similar observations); q=different qualities (in C+8, a quality is a piece of qualitative information), which can be any number of things-behaviors, energies, concepts, events, and so on, which become quantified within the analytical process; and t=time (years, seconds, days, whichever is desired to measure the data history). The example below shows combined sets of circumplex data, using as P(g) value Nations, and as q value social measurements within each of these nations, see FIG. 5.

Figure 6:
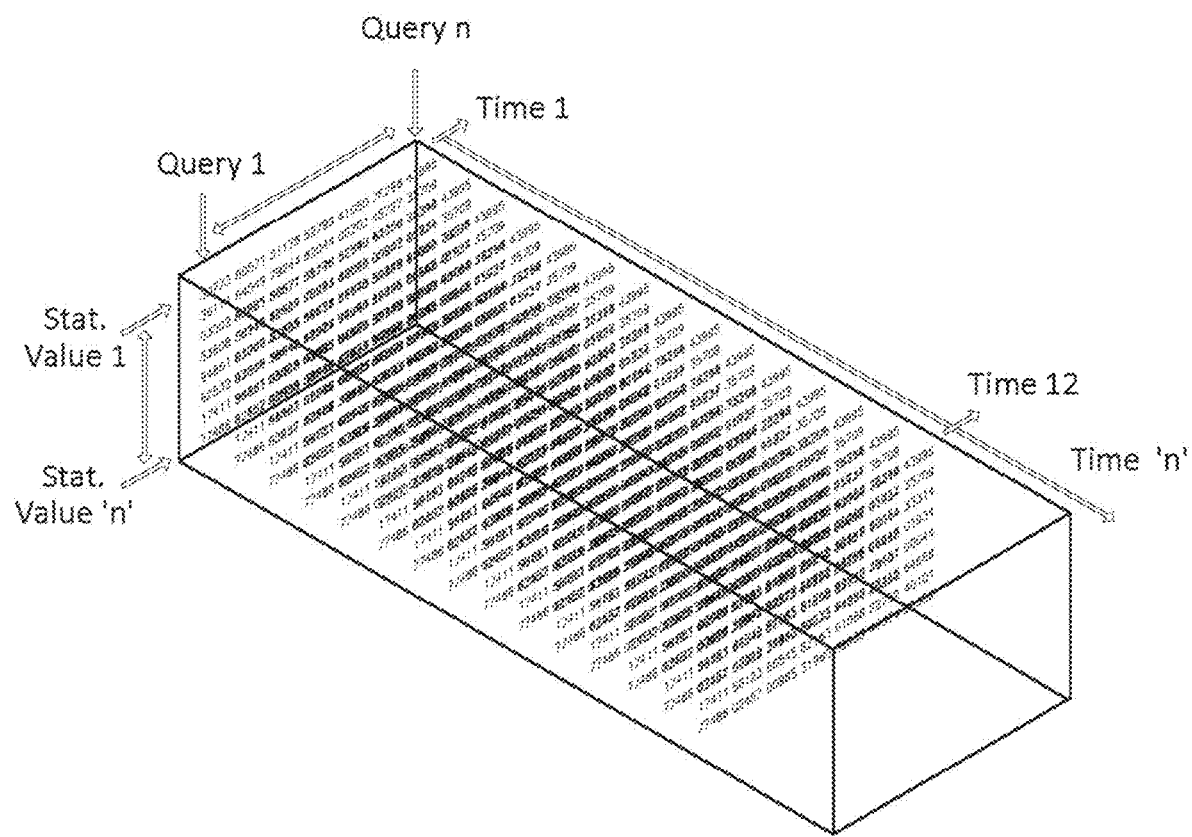
FIG. 6 showing a cube comprising generated data according to an aspect of the present invention.

Queries are run through the Technical Energy Diagram for each country and the resulting data (q here equals the 14 energy layers) is viewed for the desired time period. The quality "hope," for instance, can be compared among any countries desired. The Cube has no predefined size, any of the dimensions can contain theoretically an unlimited number of variables, only limited by the memory and processing power of the computer, see FIGS. 6 and 7.

IX. Extract Asymmetric Patterns

Figure 8:
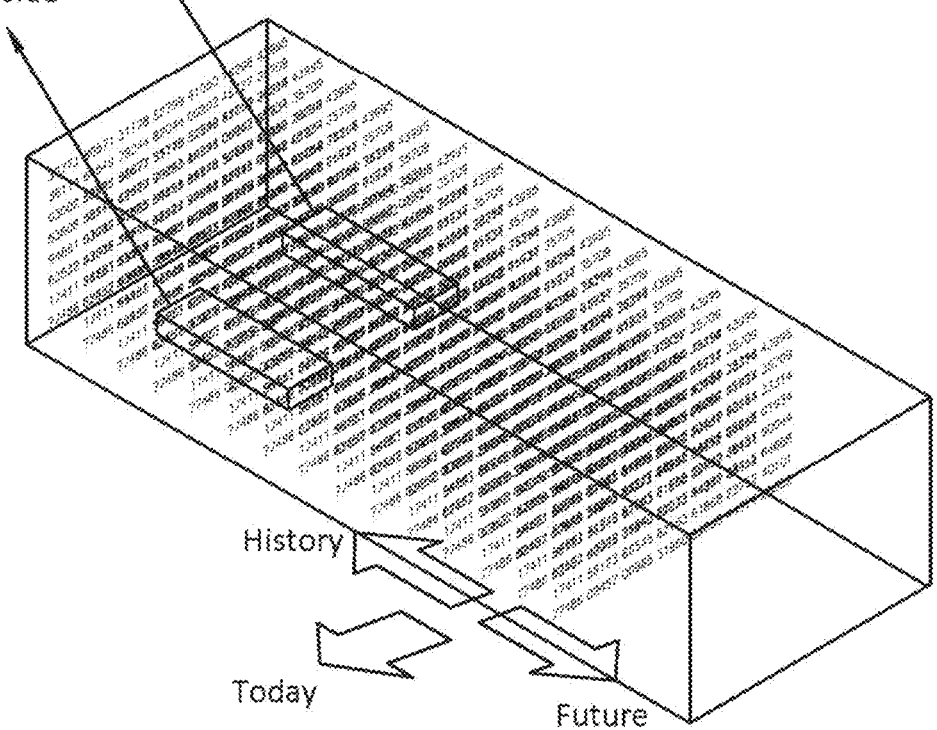
FIG. 8 showing a query result according to an aspect of the present invention.
Figure 9:
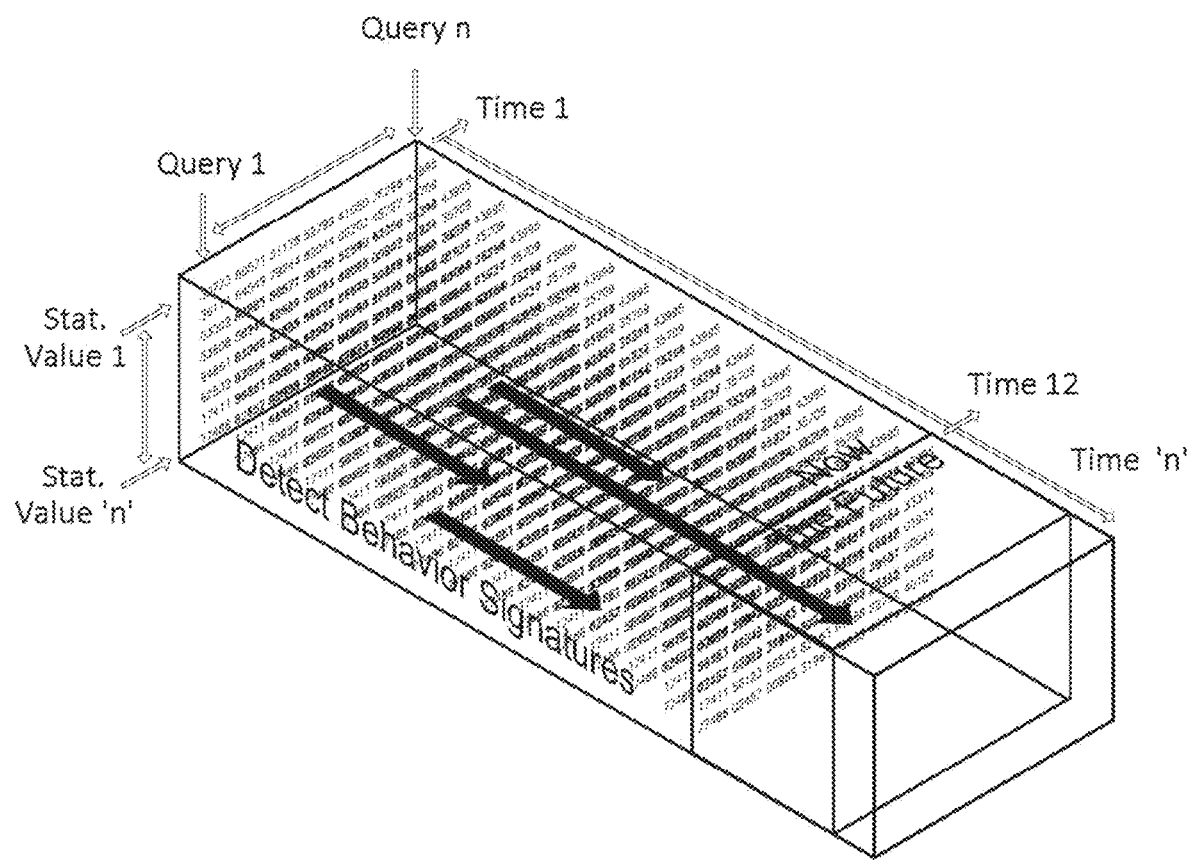
FIG. 9 showing a prediction of future data according to an aspect of the present invention.

Using the Cube, we now extract the patterns and signatures of the previously loaded circumplex asymmetric values and value ranges (weak signals) which reoccur within the observed cube data sets. The associative context must be preserved and understood as an integral contextual element part of the pattern itself. The same quality can be compared in the same query (environment) or in different ones at different points in time (in the first option we can look at Germany's GDP over 20 years and compare one year to another, but in the second we can also compare Germany's GDP with France's and Spain's also over 20 years), see FIGS. 8 and 9.

X. Create Event Overlay

Figure 10:
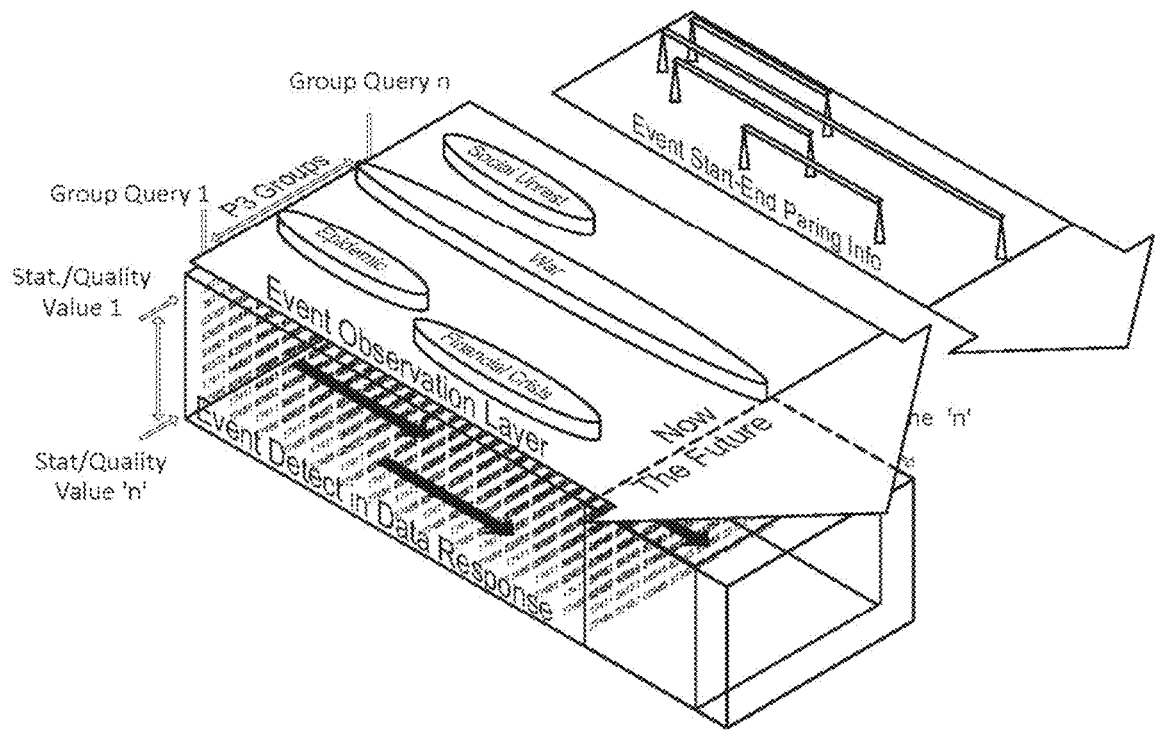
FIG. 10 showing an aspect of creating an event overlay according to an aspect of the present invention.

In the next step we create qualified and quantified event overlays for the cube, and coordinate weak signals with pre- during- and post-event statistical data to establish event signatures, see FIG. 10.

Various Decision Support Tools using inputs from all available data analysis models, such as the circumplex of collective moods, or the Indicators, then calculate a assumed action or event against all obtainable analysis output and places its viability on a vertical axis, along with scores across a horizontal axis of Risk or Impact Potential. The signals that our data models—the circumplex, the cube, the indicators—computed from the complex C+8 network of entities—are, thus, placed in an interpretive context, and can be understood better, as they are oriented towards a specific action.

XI. Automatically Extract Predictive Patterns

The final step is the automatic extraction of predictive patterns (stochastic signatures and event markers) from real-time data to create probable forward scenarios for all the observed data, reporting, visualizing, and describing unfolding events, trends, and their probable consequences. In other words, we automatically communicate early signals which may indicate asymmetric events to clients via push apps and visualization monitors. In C+8 enabled analysis it is of critical importance to perform quantitative analysis not only between two or three nodes of the system, but the entire system, which is context to the studied problem. Only in this way we can understand and predict its evolution into the future with any reasonable validity. Quantitative analysis of system behavior is in the context of C+8 analysis the application of mathematical models, conceptualized from a robust corpus of environment-behavior-consequence interactions in the experimental analysis of systemic behavior, with the aim to describe and/or predict relations between a dependent variable and all possible levels of an independent variable. Most importantly, the parameters in the models must gain clear mathematical meaning (through generalized built-in thresholds) well beyond the fitting of models to data, to cut off all attempts to introduce operator bias into the analytics process.

Behavioral economics studies the effects of psychological, cognitive, emotional, cultural and social factors on the economic decisions of individuals and institutions and how those decisions vary from those implied by classical theory.

Behavioral momentum is in C+8 a continuous method and quantitative analysis of systemic behavior, its probability to change, and is a behavioral concept largely based on physical momentum. It tracks and compares with similar systems the general relations between resistance to change (persistence of behavior) and the rate of reinforcement obtained in a given situation, based either on threats to change or incentives to change. Given continuous observation and tracking of such discovered processes in systems will give opportunities to build over time increasingly accurate probability models, which then become applied as output in analytics visualizations.

In case of C+8 general system analysis, the mathematical tools used have integrated models from economics, zoology, philosophy, and other branches of psychology, especially mathematical psychology of which it is a branch. Quantitative analysis of systemic behavior addresses in the context of C+8 quantitative analysis of systems with human participation the following topics among others: behavioral economics, behavioral momentum, connectionist systems or neural Connectionist systems are artificial neural networks based expert systems where the network generates inferencing rules e.g., fuzzy-multi layer perceptron where linguistic and natural form of inputs are used. In C+8 these tools are used only on very targeted and specific problem types, to maintain maximum transparency in the overall analytics process.

In economic systems analysis of C+8, hyperbolic discounting is a time-inconsistent model of delay discounting. It is one of the cornerstones of behavioral economics, and in C+8 implemented as automated monitoring function, to gain statistically significant predictability in economic systemic behavior in groups of different demographics and background. The discounted utility approach of this type of analysis states that intertemporal choices are no different from other choices, except that some consequences are delayed and hence must be anticipated and discounted (i.e., re-weighted to take into account the delay). Given two similar rewards, humans generally show a preference for one that arrives sooner rather than later. Humans are said to discount the value of the later reward, by a factor that increases with the length of the delay. This process is traditionally modeled in the form of exponential discounting, a time-consistent model of discounting. Analysis in C+8 data has demonstrated deviations from the constant discount rate assumed in exponential discounting. Hyperbolic discounting is an alternative mathematical model that accounts for these deviations, which derive from composition differences in analyzed groups, such as age, economic status, or ethnic background. According to hyperbolic discounting, valuations fall in general relatively rapidly for earlier delay periods (as in, from now to one week), but then fall more slowly for longer delay periods (for instance, more than a few days). For example, in independent studies on this subject, humans would be indifferent between receiving 15

Euro immediately or 30 Euro after 3 months, 60 Euro after 1 year, or 100 Euro after 3 years. These indifferences reflect annual discount rates that declined from 277% to 139% to 63% as delays got longer. This contrasts with exponential discounting, in which valuation falls by a constant factor per unit delay and the discount rate stays the same. The standard used to reveal a systems' hyperbolic discounting curve is to compare short-term preferences with long-term preferences. Typically, a significant fraction of decisions are made in favor of the lesser amount today, but wait one extra day in a year in order to receive the higher amount instead. Individuals or groups with such preferences are typically classified as "present-biased". The most important consequence of hyperbolic discounting is that it creates temporary preferences for small rewards that occur sooner over larger, later ones. Individuals and groups using hyperbolic discounting reveal a strong tendency to make choices that are inconsistent over time-they make choices today that their future self would prefer not to have made, despite knowing the same information. This dynamic inconsistency happens because hyperbolas distort the relative value of options with a fixed difference in delays in proportion to how far the choice-maker is from those options. By tracking in C+8 continuously these tendencies in various observable groups gives not only insight on their economic behavior patterns, but they translate also into social and political decision making. They are therefore important input factors amongst others, into the matrix of forces and tendencies/choices in social systems.

Foraging under C+8 is a branch of behavioral systems ecology analysis that quantitatively tracks the foraging behavior of observed systems in response to the environment in which the system functions. The observational tools of C+8 are typically applied to economic systems to understand foraging; Systems studied by the automated processes of C+8 are initially a type of optimal model. Foraging technics are applied in terms of optimizing the insight into the payoff from a foraging decision. The payoff for many of these models is the amount of energy system receives per unit time, more specifically, the highest ratio of energetic gain to cost while foraging. Foraging in this way typically predicts that the decisions that maximize energy per unit time and thus deliver the highest payoff will be selected and mostly persist. Key words used to describe foraging behavior include resources, the elements necessary for system survival and sustainability which have a limited supply, adverse environmental conditions, any enemy that consumes a systems resources, and act predatorily, will end the system, wholly or in part, over time, depending on an equation of energy, time, adversarial forces and quantitative evaluation of each. This analysis also accounts for adversarial forces generated as a consequence of the system itself, in much the way, in which a yeast colony will suffocate eventually in its own waste.

In C+8 the matching law is used and continuously tested and adjusted as a quantitative relationship that holds between the relative rates of response and the relative rates of reinforcement in concurrent schedules of reinforcement. For example, if two response alternatives A and B are offered to a system, the ratio of response rates to A and B equals the ratio of reinforcements yielded by each response. This law applies fairly well when systems become exposed to concurrent variable interval schedules detection, neural hysteresis, and reinforcement control. Under C+8, these tools are automated, and its applications are generalized across the entire statistics layer.

XII Signal Detection

Signal Detection is a key standard in the C+8 analytics library of statistical tools. It gives means to measure the ability to differentiate between information-bearing patterns (stimulus in living systems, signal in machines) and random patterns that distract from the information (called noise, consisting of background stimuli and random activity of the detection machine and of the nervous system of the operator). There are a number of methods used by C+8 to detect signals, and to determine signal threshold levels. These will, of course, be different for different methods.

Changing the threshold will affect the ability to discern, often exposing how adapted the system is to the task, purpose or goal at which it is aimed. When the detecting system is a human being, or a group of humans, organized by a set of filter factors, characteristics such as experience, expectations, physiological state (e.g., fatigue) and other factors can affect the threshold applied. For instance, a sentry in wartime might be likely to detect fainter stimuli then the same sentry in peacetime due to a lower criterion, however they might also be more likely to treat innocuous stimuli as a threat.

Therefore, all signal detection tasks in C+8 are generalized, alone with the filter definitions of the data selection, to repeat the process of detection continuously and under structures selection conditions.

In C+8, the process of selecting detection methods and setting thresholds becomes an automated strategy, continuously refined as more data arrive. C+8 can, and does, also devise new detection methods and new ways of refining thresholds. This makes the system evolve naturally. The analytics matrix is adjusted to fit the object data pool. New data are added, data that may become critical to know later, without a user having specifically instructed the analytics layer to collect specific signal for a specific system and condition. By growing a dynamic system signal library, and by tuning thresholds based on increased data availability, the system can proactively serve analyzed data as automated response to later operator queries and even suggest new operator focus areas.

The scalar timing or scalar expectancy theory (SET) is a model of the processes that govern systems behavior controlled by time. The model posits an internal clock, and particular memory and decision processes. In C+8 analysis, SET is one of the more important models of mixed-system timing behavior, including conflicts.

Hysteresis in C+8 analysis is in general terms the observation and recording of the dependence of the state of a system on its history. Plots of a single component of the moment often form a loop or hysteresis curve, where there are different values of one variable depending on the direction of change of another variable.

Reinforcement learning (RL) is an area of machine learning concerned with how software agents ought to take actions in an environment so as to maximize some notion of cumulative reward. Reinforcement learning is one of three basic machine learning paradigms, alongside supervised learning and unsupervised learning. RL is a standard tool in the C+8 statistics library, to observe systems and predict their behavior.

All these steps occur at the same time as the system is continuously optimizing itself, while new inputs are simultaneously contributing to this optimization. Predictions made by data in the sandbox is validated continuously against real-world confirmation data.

What is claimed is:

1. A method for hardware based package analysis for interpreting data sources, comprising the steps of:
performing (100) data import from a developing distributed heterogeneous data source, thereby extracting (101) object entities from different raw data formats and storing (102) these object entities as textual object entities;
extracting (103) respectively at least one object entity property for each of the object entities from the distributed heterogeneous data source;
generating (104) relations between the stored textual object entities as a function of the at least one extracted object entity property;
assigning (105) a unique IPv6 address to respectively each object entity, respectively each object entity property and respectively each relation;
forming (106) an at least partially hardware based computer network, wherein each object entity, each object entity property and each relation is represented as a network component being addressable by the respective IPv6 address;
operating (107) the network by sending at least one package over the network between the network components at the occurrence of respectively one of the object entity, object entity property or relation in the heterogeneous data source;
calculating (108) statistical measurement parameters for describing a dataflow in the formed computer network and storing resulting measurement parameters as a first measurement parameter set;
repeating (109) the above steps time delayed while the distributed heterogeneous data source develops and storing (110) resulting measurement parameters as a second measurement parameter set; and
extracting (111) deviations in the second measurement parameter set from the first measurement parameter set and extrapolating (112) the extracted deviations to predict future measurement parameters.

2. The method of claim 1, wherein extracting (101) object entities from different raw data formats comprises at least one technique of classification, natural language processing, stemming, computational learning, artificial intelligence, operating a neuronal network, pattern matching, voice recognition, image processing and/or data analysis.

3. The method of claim 1, wherein extracting (103) respectively at least one object entity property comprises identifying at least one of a time-stamp, a period of time, an instance, a class, an object entity property, an object behavior, an object function, a subject, an verb, an object, a cardinality, a causality, a tuple, a triple, a cause and/or an effect.

4. The method of claim 1, wherein generating (104) relations comprises at least one technique of clustering, classification, artificial intelligence, natural language processing and/or evaluation of entity properties.

5. The method of claim 1, wherein statistical measurement parameters comprise at least one of a cardinality, a distribution, an asymmetric shift, a normalization history, a time-series, a baseline, continuous quantitative measurement parameters, a data fluctuation, a cluster, a class, a deviation and/or a mathematical parameter.

6. The method of claim 1, wherein the distributed heterogeneous data source develops by at least one operation of adding, changing, updating, enhancing, deleting and/or modifying an information item.

7. The method of claim 1, wherein the method is performed iteratively and the extrapolating is performed using several deviations.

8. The method of claim 1, wherein extrapolating is performed using at least one of a mathematical function, applying an ontology, applying artificial intelligence, applying a history database and/or applying predictive technologies.

9. The method of claim 1, wherein the method is performed for a selection of object entities provided through a user interface.

10. The method of claim 1, wherein a threshold is applied for exclusion of measurement parameters.

11. A system arrangement for hardware based package analysis for interpreting data sources, comprising:
an import interface arranged to perform (100) data import from a developing distributed heterogeneous data source, thereby being arranged to extract (101) object entities from different raw data formats and store (102) these object entities as textual object entities;
an analysis unit arranged to extract (103) respectively at least one object entity property for each of the object entities from the distributed heterogeneous data source;
a processing unit arranged to generate (104) relations between the stored textual object entities as a function of the at least one extracted object entity property;
a processing unit arranged to assign (105) a unique IPv6 address to respectively each object entity, respectively each object entity property and respectively each relation;
network components arranged to form (106) an at least partially hardware based computer network, wherein each object entity, each object entity property and each relation is represented as a network component being addressable by the respective IPv6 address;
a control unit arranged to operate (107) the network by sending at least one package over the network between the network components at the occurrence of respectively one of the object entity, object entity property or relation in the heterogeneous data source;
a calculation unit arranged to calculate (108) statistical measurement parameters for a dataflow in the formed computer network and storing resulting measurement parameters as a first measurement parameter set;
a triggering unit arranged to repeat (109) the above steps time delayed while the distributed heterogeneous data source develops and being arranged to store (110) resulting measurement parameters as a second measurement parameter set; and
a computing unit arranged to extract (111) deviations in the second measurement parameter set from the first measurement parameter set and extrapolate (112) the extracted deviations to predict future measurement parameters.

12. A computer program product comprising a non-transitory computer readable storage medium containing instructions, when executed by a processor, cause a system arrangement for hardware based package analysis for interpreting data sources, comprising:
an import interface arranged to perform (100) data import from a developing distributed heterogeneous data source, thereby being arranged to extract (101) object entities from different raw data formats and store (102) these object entities as textual object entities;
an analysis unit arranged to extract (103) respectively at least one object entity property for each of the object entities from the distributed heterogeneous data source;

a processing unit arranged to generate (104) relations between the stored textual object entities as a function of the at least one extracted object entity property;

a processing unit arranged to assign (105) a unique IPv6 address to respectively each object entity, respectively each object entity property and respectively each relation;

network components arranged to form (106) an at least partially hardware based computer network, wherein each object entity, each object entity property and each relation is represented as a network component being addressable by the respective IPv6 address;

a control unit arranged to operate (107) the network by sending at least one package over the network between the network components at the occurrence of respectively one of the object entity, object entity property or relation in the heterogeneous data source;

a calculation unit arranged to calculate (108) statistical measurement parameters for a dataflow in the formed computer network and storing resulting measurement parameters as a first measurement parameter set;

a triggering unit arranged to repeat (109) the above steps time delayed while the distributed heterogeneous data source develops and being arranged to store (110) resulting measurement parameters as a second measurement parameter set; and a computing unit arranged to extract (111) deviations in the second measurement parameter set from the first measurement parameter set and extrapolate (112) the extracted deviations to predict future measurement parameters, to execute the steps of the method of claim 1.

* * * * *